United States Patent [19]

Shnell

[11] Patent Number: 5,661,977

[45] Date of Patent: Sep. 2, 1997

[54] SYSTEM FOR GEOTHERMAL PRODUCTION OF ELECTRICITY

[76] Inventor: James H. Shnell, 1371 Smokewood Dr., Santa Ana, Calif. 92705

[21] Appl. No.: 650,595

[22] Filed: May 31, 1996

Related U.S. Application Data

[63] Continuation-in-part of Ser. No. 486,704, Jun. 7, 1995.
[51] Int. Cl.[6] ........................................ F03G 7/00
[52] U.S. Cl. ........................ 60/641.2; 60/659; 422/212
[58] Field of Search ........................... 60/641.2, 652, 60/659, 39.5, 731; 422/212

[56] References Cited

U.S. PATENT DOCUMENTS

| | | |
|---|---|---|
| 3,858,397 | 1/1975 | Jacoby. |
| 4,002,729 | 1/1977 | Abraham et al.. |
| 4,085,795 | 4/1978 | Gill. |
| 4,192,371 | 3/1980 | Derouette et al.. |
| 4,372,386 | 2/1983 | Rhoades et al.. |
| 4,492,083 | 1/1985 | McCabe et al. ............ 60/641.2 X |
| 4,601,884 | 7/1986 | Coeckelberghs et al. ...... 422/212 X |
| 4,696,802 | 9/1987 | Bedell ........................ 60/641.2 X |
| 4,844,162 | 7/1989 | Maassen et al. .............. 60/641.2 X |
| 4,927,856 | 5/1990 | Elion. |
| 4,937,052 | 6/1990 | Takahashi et al.. |
| 5,052,482 | 10/1991 | Gondouin. |
| 5,202,194 | 4/1993 | Vanberg, Jr.. |
| 5,255,740 | 10/1993 | Talley. |

FOREIGN PATENT DOCUMENTS

| | | |
|---|---|---|
| 0511180A1 | 10/1992 | European Pat. Off.. |
| 59-222225 | 12/1984 | Japan. |
| 60-035182 | 2/1985 | Japan. |
| 63-032110 | 2/1988 | Japan. |
| 63-084629 | 4/1988 | Japan. |
| 2058935 | 4/1981 | United Kingdom. |

*Primary Examiner*—Hoang Nguyen
*Attorney, Agent, or Firm*—Knobbe, Martens, Olson & Bear, LLP.

[57] ABSTRACT

A system for the generation of electricity from geothermal energy that is less expensive and more efficient, and avoids dealing with undesirable byproducts, is disclosed. The first system of the present invention relies on using endothermic reactions at the bottom of a well to capture and store the geothermal heat, and exothermic reactions at the top of the well to release the heat stored within the products of the endothermic reactions. In one preferred embodiment, the endothermic reaction is the decomposition of water. To induce the endothermic reaction as well as to harvest and separate the resulting products, a catalytic device is used where each type of product selectively diffuses into its individual conduit. The endothermic products undergo the exothermic reaction in a combustion turbine, and the products of the exothermic reaction are immediately condensed in a condenser. In one preferred embodiment, the condenser condenses steam into liquid water to be returned down the well, thus creating a closed system. The second system of the present invention relies on using a thermocouple to convert the geothermal heat at the bottom of a well into electricity. The electricity is used to create products by electrolysis, which products are then used in an exothermic reaction to generate electricity, or the electricity is supplied to the purchaser or user thereof. In one preferred embodiment, water is separated electrolytically into hydrogen and oxygen, which then diffuse selectively into individual conduits. The products undergo combustion in a turbine, which generates electricity, and the products are then condensed and returned down the well, creating a closed system.

29 Claims, 11 Drawing Sheets

SYSTEM FOR GEOTHERMAL PRODUCTION OF ELECTRICITY

This application is a continuation-in-part of copending application Ser. No. 08/486,704, filed Jun. 7, 1995.

FIELD OF THE INVENTION

This invention relates to the production of electricity by the use of geothermal heat, and more particularly to the use of geothermal heat to generate products of endothermic reaction by a catalytic device or a thermocouple device.

BACKGROUND OF THE INVENTION

Current systems for the production of electricity from geothermal energy rely on the heat in the earth's crust to vaporize water or another liquid; the vapor is then used in a turbine to generate electricity. The geothermal heat is generally brought to the surface via wells that tap into reservoirs of steam or brine that circulate at depths in the crest sufficient to collect a substantial amount of heat. An example is found in U.S. Pat. No. 3,786,858 (1974).

However, modem steam turbines operate most efficiently at very high temperatures, substantially higher than the temperatures achieved in the steam or brine reservoirs generally used to produce geothermal electricity. The heat present at depths within the earth that is attainable (for practical purposes) is not sufficiently concentrated. Geothermally powered steam turbines are therefore less efficient. They are also limited in operation by the fact that the heat removed from the earth cannot be stored for later use. The heat must be used immediately or lost.

In addition, the brine or steam loses a significant amount of its heat (generally 25% to 30%) as it is brought to the surface. Brine or steam from geothermal reservoirs is generally accompanied by hydrogen sulfide and other undesirable gases, which must be captured before they escape into the atmosphere. Because the temperature of the brine or steam is relatively low, a large amount must be transported to the surface to generate a sufficient level of electricity. Consequently, large-diameter wells, which are expensive to drill, are required. Moreover, the brine or steam that is brought to the surface is often highly mineralized and corrosive. If it is used directly in a turbine, the turbine must be modified to withstand these conditions, thereby further deceasing the efficiency of the system. In the alternative, the brine or steam may be used to boil another fluid through a heat exchanger in a binary generating system. This alternative also loses some efficiency through the heat exchanger.

Another problem that can be caused by the minerals in the brine or steam is scaling in the wells, which can build up over, time and must be periodically removed. The brine presents problems of disposal after it has been used, unless it is reinjected into the reservoir, which requires expensive pumping and may contaminate the reservoir. Even if the brine is reinjected, some of the salts may drop out of the solution as the brine is cooled prior to reinjection. These salts, which may be radioactive or otherwise hazardous, must be safely removed and discarded.

The most significant limitation is that there are very few reservoirs that are both large enough and hot enough to make geothermal exploitation an economical prospect. The conventional method for geothermal production of electricity is thus very limited in application.

Research is currently being conducted into the possibility of drilling into hot, dry rock ("HDR") and injecting water to create a geothermal reservoir which can then be tapped to generate electricity. Such systems, however, face many of the same problems as conventional geothermal systems and are more expensive. Prior HDR systems require two wells to be bored, an injection well for injecting the water to create a reservoir and a separate production well for continuously bringing the steam to the surface. Employing only one well for injecting water and retrieving steam would not be efficient, since either too much energy would be lost when the injected water passes the rising steam, or the steam would be retrieved only intermittently so that energy would not be supplied to the generator on a continuous basis.

The injection of water into the rock requires an amount of energy that represents a significant fraction of the energy that the system can produce, thus lowering the efficiency of the system. Also, a certain percentage of the water that is injected is lost into fractures in the rock, and is not returned up the production well. The greater the amount of pressure that is used to drive the water from the injection well to the production well, the more water is lost. The higher pressure at the injection well causes the cracks to dilate, as does the colder water, which causes the rock to contract. The dilation is needed at the production well, where it accelerates the release of the energy in the rock. Tests have shown that short-term shutting-in of the production well improves overall production from the well by increasing dilation therein.

With geothermal production technology still at its infancy, the predominant method used for the generation of electricity is the combustion of hydrocarbons and the conversion of the resultant heat to electricity. Up until the last decade, most electricity was generated by the combustion of coal to produce steam. Recently, approximately half of all new electric generating capacity has taken the form of combustion turbines burning oil or natural gas and using the power to create electricity through a direct link to a generator. In a system using a "combined cycle," the heat from the combustion turbine exhaust is used to create steam, which then generates additional electricity in a steam turbine. However, a combustion turbine uses a significant amount of the energy it creates to compress the air that it takes in to sustain its operation. Each of the foregoing combustion processes releases substantial amounts of nitrogen oxides that create air pollution and the potential for acid rain. They also produce carbon dioxide, thus contributing to global warming. If coal or oil is used as the fuel, sulfur dioxide is also released into the atmosphere, which may produce additional acid rain, and particulates may be released as well. The combustion of coal also produces ash, which must be disposed of properly. Moreover, these processes all deplete limited natural resources.

Other technologies used to produce electricity include nuclear, hydroelectric, solar, and wind generation. Nuclear generation is expensive and presents serious issues of disposal and contamination. Hydroelectric, solar, and wind generation face temporal and spatial imitations in terms of the areas in which they are effective, thereby necessitating extensive collection systems and causing environmental impacts. Further, solar and wind generation are significantly more expensive than conventional technology.

Much of the electricity currently produced is generated by condensing steam turbines. Fuel is combusted and the exhaust is released into the atmosphere, while the heat produces superheated stem. The stem passes through a steam turbine generator for generating electricity and is condensed at the end of the cycle. The drop in pressure due to condensation at the outlet end of the turbine permits the turbine to turn more freely, but the overall process is still less than forty percent efficient, in part due to the need to convert the combustion heat into steam energy. A significant amount of energy is also lost through the exhaust of the combustion process.

A steadily increasing portion of new generating capacity installed in recent years is in the form of combustion turbines. Combustion turbines use the energy released from combustion to turn the shaft on a turbine, which then turns an electrical generator. The turbine requires a large volume of air for the combustion, which requires filtering and, often, heating or cooling. It also introduces dirt into the turbine and consumes energy. The exhaust that is released into the atmosphere carries a significant mount of energy as well as pollution with it. In addition, a combustion turbine uses a significant mount of energy to compress the inlet air, yet only 16% (or less) of which is oxygen used in the combustion process.

Only recently have combustion turbines achieved efficiencies approximating 40% while operating in "simple cycle." Efficiencies approximating 50% can be achieved by combustion turbines operating in "combined cycle," in which the heat of the exhaust from the combustion turbine is converted into steam energy, which is then used to operate a stem turbine generator. This steam is not, however, as superheated as the steam that is ordinarily used in steam turbine generators. Consequently, the steam cycle of a combined cycle system is less efficient than a simple steam turbine.

The steam turbine and the combustion turbine (whether simple cycle or combined cycle) both cause pollution from the release of products and byproducts of combustion into the atmosphere. They lose efficiency because they release as exhaust a significant amount of the energy from the combustion. The stem generator and the combined cycle combustion turbine generator lose efficiency due to the conversion of heat into stem pressure.

SUMMARY OF THE INVENTION

The present invention is a system for the efficient generation of electricity from geothermal energy wherein one or more substances is transported down a well to a depth at which geothermal heat (whether from brine or steam reservoirs or hot, dry rock) is sufficient to cause an endothermic reaction or an electrolysis reaction to occur among such substances. The reaction products are then transported separately to the surface, where the products undergo a reverse (exothermic) reaction, and energy from this exothermic reaction is converted into electrical energy, whether through a steam turbine, a combustion turbine, or a combination of the two. In certain circumstances, a fuel cell might take the place of the turbine(s).

The endothermic reaction at the bottom of the well may proceed slowly, at a relatively low temperature, with the products being created and collected over a large area. The exothermic reaction will proceed rapidly and reach a high temperature, thus effectively concentrating the geothermal heat to make the production of electricity more efficient. In the first preferred embodiment of the present invention, a catalytic device is used having one or more conduits, such as tubes or porous rods, for collecting one or more of the products of the endothermic reaction and transporting such product(s) separate from the other product(s). The conduits are nested inside a ceramic material permeable by the products, where the ceramic material is surrounded by a thin film or mesh of a catalyst such as a zeolite. Although the injected water automatically undergoes the endothermic reaction upon exposure to the heat at the bottom of the well, the use of a catalyst on the surface of the catalytic device is desirable to accelerate the reaction. The tubes or conduits have a cross-sectional configuration that is effective for collecting the intended products.

One conduit or set of conduits is made from a material that is permeable by one of the products of the endothermic reaction, but not permeated by or repels (e.g., chemically, by higher pressure) the other product(s) of the endothermic reaction and the reactant(s). Another conduit or set of conduits receives the remaining product(s). The tubes will be assembled in a fashion to promote the separation of the products by absorbing them separately as they form on the surface of the catalyst. In a simple form, the catalytic device is a conduit composed of a catalyst that is permeable by only one of the products of the endothermic reaction. The other products and remaining reactants, if any, would return from the bottom of the well by a separate conduit.

In the first preferred embodiment, the catalyst is porous to all products of the endothermic reaction. A selective material that is porous to only one product surrounds the tubes or porous conduits that are closest to the surface of the catalyst, so that such product is removed from the catalyst. The innermost tube or porous conduit collects the remaining product. For instance, if the decomposition of water is the desired endothermic reaction, the catalyst will be a suitable transition metal such as, for example, palladium. The catalyst material is a thin film or mesh surrounding the porous ceramic material in which the conduits for the products are embedded. In the first preferred embodiment, a series of outer conduits absorb hydrogen, and an inner conduit absorbs oxygen. The inner conduit may be simply a hole in the porous ceramic material through which the oxygen diffuses. The series of conduits for receiving exclusively hydrogen may, for example, be made from palladium or other materials which are sufficiently porous to allow hydrogen to pass through, but not oxygen.

As the respective tubes absorb the respective products, the endothermic reaction with the assistance of the catalyst will effectively decrease the total number of molecules outside the catalytic device. Since the porous catalytic device effectively removes the endothermic products out of the reservoir, the elevated pressure in the reservoir will not oppose the endothermic reaction. In fact, the elevated pressure at the bottom of the well promotes the endothermic reaction. The optimal design for a particular catalytic device will depend on the nature of the endothermic reaction, its reactant(s) and products, the type of the catalyst used, and the conditions under which the reaction occurs.

A catalytic device constructed in accordance with the present invention will promote the endothermic reaction and, simultaneously, collect and separate the products of that reaction. The system of the present invention advantageously includes a mechanism for collecting the products of the endothermic reaction to transport them to the top of the well. The present invention will collect the products and, at the same time, segregate them in order to preclude unwanted reactions between the products or of a product with some other material. The invention will also cause the elevated pressures in the well to promote the endothermic reaction. The elevated pressures do not oppose the reaction since the porous conduits receive the reaction products.

In another embodiment, instead of using a catalytic device to catalyze the endothermic reaction, any of several reactions could be used to cause the endothermic reaction. The preferred endothermic reaction is the decomposition of water into hydrogen and oxygen. The subsequent exothermic reaction will then produce pure water, which can be transported back down the well for another cycle. However, the temperature ordinarily necessary for the thermal decomposition of water is not present in the earth's crust at a depth that is currently attainable by practical means. Thus, the decomposition of water may be achieved through a sequence of reactions having sufficiently lower activation energies (such as $4H_2O+2SO_2+2I_2 \rightarrow 2H_2SO_4+4HI$ and $2H_2SO_4 \rightarrow 2SO_2+2H_2O+O_2$ and $4HI \rightarrow 2I_2+2H_2$, which results in a net reaction of $2H_2O \rightarrow 2H_2+O_2$) to permit the decomposition of water to occur under the conditions obtained in the well. The products of the decomposition are then gathered and transported separately to the surface, where they may be stored (separately) until used in the exothermic reaction. The product of the exothermic reaction is then returned to the well in a closed cycle.

Another reaction that can be used, the "water gas" reaction, $CH_4+H_2O \rightarrow CO+3H_2$, occurs spontaneously at 800° C. However, most such reactions may require oxygen from the air to complete the exothermic reaction and (whether or not they so require air) they may produce, in the course of the subsequent exothermic reaction, carbon dioxide, nitrogen oxides, or some other undesirable product. In addition, efficiency may be lost due to the need to use heat exchangers or other means to handle certain reaction products.

The second embodiment of this invention is a system for the efficient generation of electricity from geothermal energy wherein one juncture of a thermocouple is transported down a well to a depth at which geothermal heat is sufficient to create a temperature difference, relative to the temperature of the other juncture of the thermocouple. The temperature difference will cause the thermocouple to produce electricity. In a simple embodiment, one juncture of the thermocouple is transported down a well and the other juncture is maintained at a relatively low temperature outside of the well, at the surface, and the resulting electricity is supplied directly to the purchaser or user of the electricity.

In another embodiment of this invention, one juncture of the thermocouple is transported down a well and the other juncture is maintained at a relatively low temperature outside of the well, at the surface, and the resulting electricity is used to dissociate a compound (such as water) into endothermic products (such as hydrogen and oxygen) by electrolysis. The electrolysis may be conducted in the well, in which case the products are transported to the surface by conduits, or the electrolysis may be conducted outside of the well, at the surface. The endothermic products (e.g., hydrogen and oxygen) are then used as fuels, as discussed above, in order to generate electricity.

In the second preferred embodiment of this invention, the thermocouple is used in conjunction with the conduits described above, but without a catalyst. One juncture of the thermocouple is transported down a well on the outside of the conduits, and the other juncture is inside the conduits. The first juncture, outside the conduits, is more affected by the geothermal heat than the second juncture. The juncture inside the conduit is cooler because the pressure inside the conduit is much lower than the pressure outside the conduit, resulting in a lower temperature inside the conduit. Because the second juncture inside the conduit is at a lower temperature than the juncture outside the conduit, the thermocouple will generate electricity from the temperature differential. The electricity is used to dissociate a compound (such as water) into endothermic products (such as oxygen and hydrogen) by electrolysis, and they are then transported up the well in the conduits and used as fuels to generate electricity, as set forth above.

Electricity generating systems constructed in accordance with the invention offer advantages over existing generating technologies. The primary advantage over existing geothermal systems is that the system of the present invention absorbs a greater amount of heat per unit volume through the endothermic reaction than can be captured by the heated brine or steam. For example, the decomposition of a given mass of water captures five to six times the amount of heat that is represented by the same mass of steam. Further, higher temperatures (and therefore greater efficiencies) can be obtained in the exothermic reaction and the generation of electricity.

In addition, because brine is not required by the invention, the use of geothermal energy to generate electricity in accordance with the present invention is not limited to those locations having economically viable subterranean reservoirs of heated brine. Further, no efficiency need be lost to heat exchangers in order to avoid mineral deposits in the generating mechanism. So long as the products of the endothermic reaction are kept separate, none of the energy gained at the bottom of the well is lost in bringing the energy to the surface. The products of the reactions will not be corrosive to the equipment. No toxic gases will be released to the atmosphere. The products of the endothermic reaction convey the energy in a much smaller volume, and therefore the borehole drilled for creating the well may have a much smaller diameter and is thus less expensive to bore. In addition, only one well is required instead of two since the injected water will not react with the endothermic reaction products that are drawn up through separate conduits within the well. Any injection of water will be made at the "production" well. As a result, much of the pumping energy now used to force the water from the injection well through the fractures to the production well will be saved, water loss into the rock will be lower, and well performance should be improved in the manner indicated by the shutting-in tests of existing geothermal production wells.

Moreover, mineral deposits will not build up and present problems in the well. The reinjection or disposal of the brine will not be required. To the extent that the endothermic reaction is (on a net basis) the decomposition of water, no pollution will be created, let alone released into the atmosphere, and there will be no waste of limited resources. The products of the endothermic reaction can be stored and used when electricity is needed. If the products of the endothermic reaction come out of the ground at high pressure, they can be stored and used at high pressure, avoiding the need to compress them prior to the exothermic reaction (a step that requires significant energy in combustion turbines) or, if the exothermic reaction does not require compression, the excess pressure from the well can be used to generate additional energy.

The preferred apparatus for exothermic reaction comprises the combination of a "combustion" turbine which is fueled by two or more reactants that combine in an exothermic reaction (the product(s) of which can be condensed) and a condenser. In a preferred embodiment, the reactants are hydrogen and oxygen which are produced by the endothermic reaction at the bottom of the well. The hydrogen acts as a fuel and, when mixed with the oxygen, combusts to create steam. Following the final power stage in which the exothermic reaction is harnessed by the "combustion" turbine, the product(s) of the exothermic reaction is/are condensed, thus reducing the amount of back-pressure on the combustion turbine and increasing its efficiency. The preferred combination turbine would be fueled with hydrogen and oxygen, which would be combusted to produce steam and be condensed at the outlet end of the turbine. Such a combination turbine could be used as a part of the system of the present invention or could operate independently on other fuel sources. Alternatively, the system of the present invention could also employ either a standard combustion turbine or a boiler combined with a steam turbine or a fuel cell.

Combination turbines constructed in accordance with the invention offer several advantages. By condensing the product(s) of the exothermic reaction, the combination turbine will reduce the back pressure of the exhaust from the combustion turbine and increase the pressure drop across the final combustion stages of the turbine. Advantageously, the power turbine section of the combination turbine generally has more power stages than the power turbines of prior art combustion turbines, thus harnessing more of the energy from the exothermic reaction and increasing the efficiency of the turbine and simultaneously making it easier to condense the steam at the outlet of the turbine. In addition, the combination turbine will not require a heat exchanger to generate steam, thereby increasing its efficiency. To the extent that condensation creates a "closed loop" (i.e., all of the products are condensed or otherwise captured) it will be possible to make productive use of some of the energy that is otherwise lost with the exhaust and further increase efficiency. To the same extent, the combination turbine will avoid releasing pollution into the atmosphere. In addition, if the combination turbine is fueled entirely from captive sources, as in the preferred model using hydrogen and oxygen, the dirt and other impurities that are taken into most prior art combustion turbines (causing wear and tear and compelling regular cleanings) is avoided, and the energy that is used by prior art combustion turbines to condense, filter, and heat or cool inlet air is conserved. Furthermore, unlike solar or hydropower systems, the combination turbine of the present invention can, depending on the volume of storage for the reactants, operate on demand, as a peaking unit or as a baseload unit.

BRIEF DESCRIPTION OF THE DRAWINGS

The preferred embodiments of this invention, illustrating all their features, will now be discussed in detail. These embodiments depict the novel and nonobvious system for the geothermal production of energy of this invention shown in the accompanying drawings, which are included for illustrative purposes only. These drawings include the following figures, with like numerals indicating like parts.

DETAILED DESCRIPTION OF THE DRAWINGS

Geothermal Generating System with Catalytic Device

Figure 1:
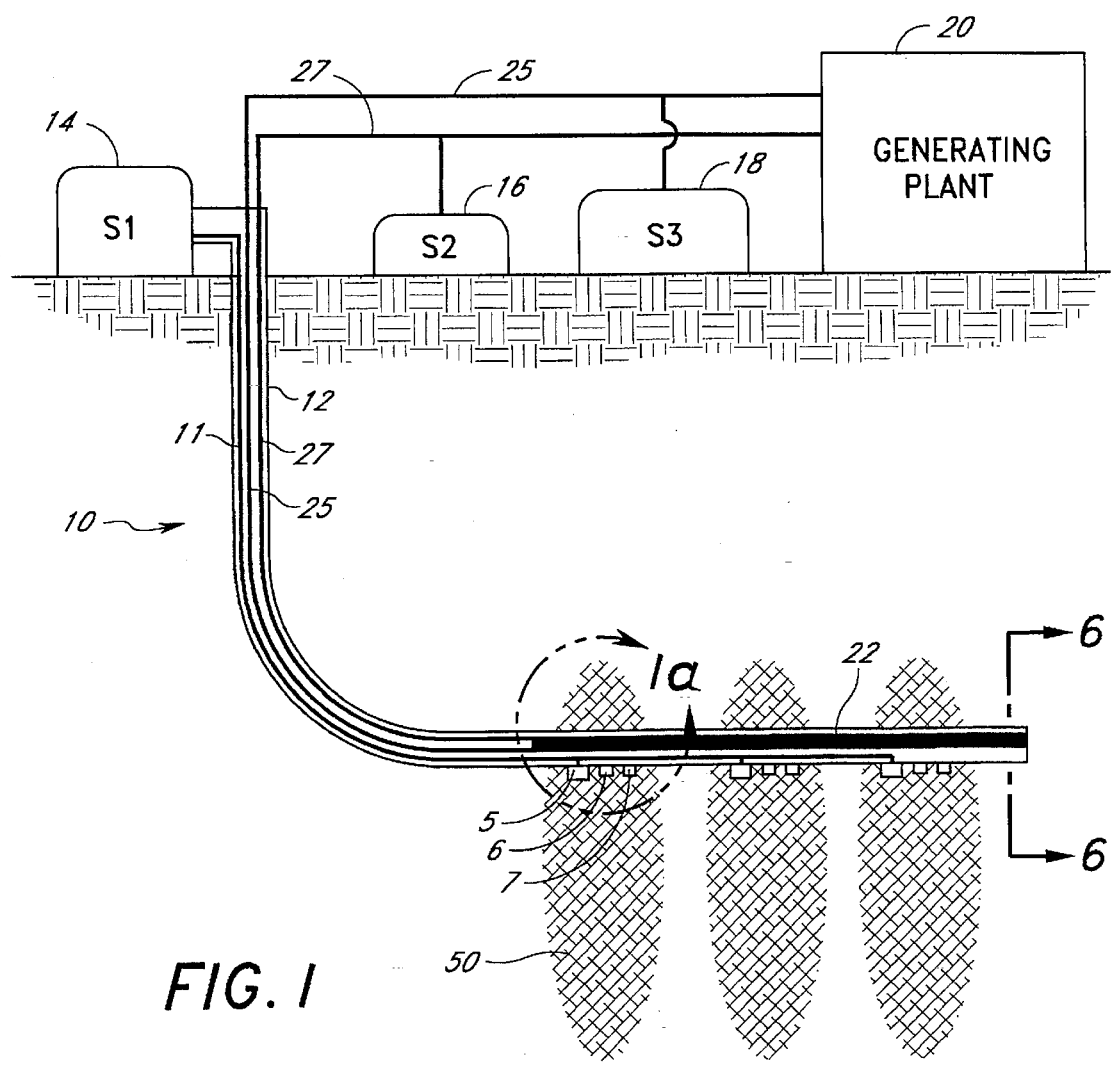
FIG. 1 is a cross-sectional schematic view of a preferred embodiment of the endothermic system of the present invention.

FIG. 1 illustrates the geothermal generating system 10 of the present invention. With the present system 10, a viable hot, dry rock system can now be efficiently used for convening geothermal heat to electricity. The present system 10 avoids the problems of pollutants, is less expensive, and is greatly improved in operating efficiency. The system 10 comprises a well 12 coupled to a storage tank 14, shown as S1 in FIG. 1, for storing the reactants that are to be used for the endothermic reaction that occurs at the bottom of the well 12 in fracture zones 50 of hot, dry rock. It is contemplated that the system 10 of the present invention may also be used at other locations deep within the earth, such as reservoirs, where the geothermal heat is hot enough to induce the desired endothermic reaction. A catalytic device 22, which catalyzes the desired endothermic reaction, resides within the bottom section of the well 12 with porous conduits or chambers 24 and 26 (shown in FIG. 6) of the catalytic device 22 coupled to standard conduits 25 and 27, respectively, which extend up through the well 12. The standard conduits 25 and 27 transport the products of the endothermic reaction at the bottom of the well 12 to the earth's surface, where the products may be stored in storage tanks 18 (S3) and 16 (S2), respectively, or delivered immediately to a generating plant 20 for conversion to electricity. The endothermic reaction products are transported separately through the porous conduits 24 and 26, and then through the conduits 25 and 27 of the present invention to the combination turbine of the present invention. In one embodiment of the present invention, the energy is released from the products upon undergoing an exothermic reaction as will be explained in greater detail below. In turn, this energy is converted to electrical energy.

In the preferred embodiment, the endothermic reactant or compound stored in the storage tank 14 is water, which is decomposed to hydrogen and oxygen at the bottom of the well 12. The storage tank 14 maintains a column of water within the well 12. Due to the high pressure environment at the bottom of the well 12 created by the column of water in the well 12, the elevated pressure forces the endothermic products through the catalytic device 22, into the porous conduits or chambers 24 and 26, and up the conduits 25 and 27.

Figure 1A:
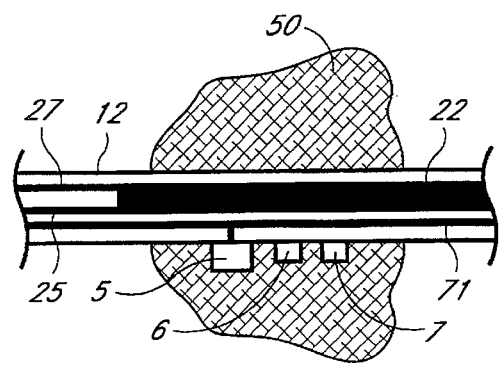
FIG. 1a is an enlarged cross-sectional schematic view of the bottom of the well of the system of FIG. 1.

A separate conduit 11 coupled to the storage tank 14 is also sent down to the bottom of the well 12 where water from the water conduit 11 may be released from the well 12 to the fracture zone 50 through a one-way valve 5 in the well 12. To create the fracture zones 50, water is injected into the hot, dry rock to dilate cracks and access a larger volume of rock for a circulating medium. Since a percentage of water is lost into the fractures in the rock, water will be needed to resupply the fracture zone from time to time through the one-way valve 5. In the preferred embodiment, the water injected into the fracture zone 50 comes from the separate water conduit 11 rather than the column of water within the well 12, since the water to be injected into the fracture zones 50 is more easily controlled by using the conduit 11 than using the water within the well 12. A pressure gauge 6 and a temperature gauge 7 on the exterior of the well 12, as shown in FIGS. 1 and 1a, measure the pressure and temperature in the fracture zone 50 so as to notify an operator when it is necessary to inject more water into the fracture zone 50.

Figure 2:
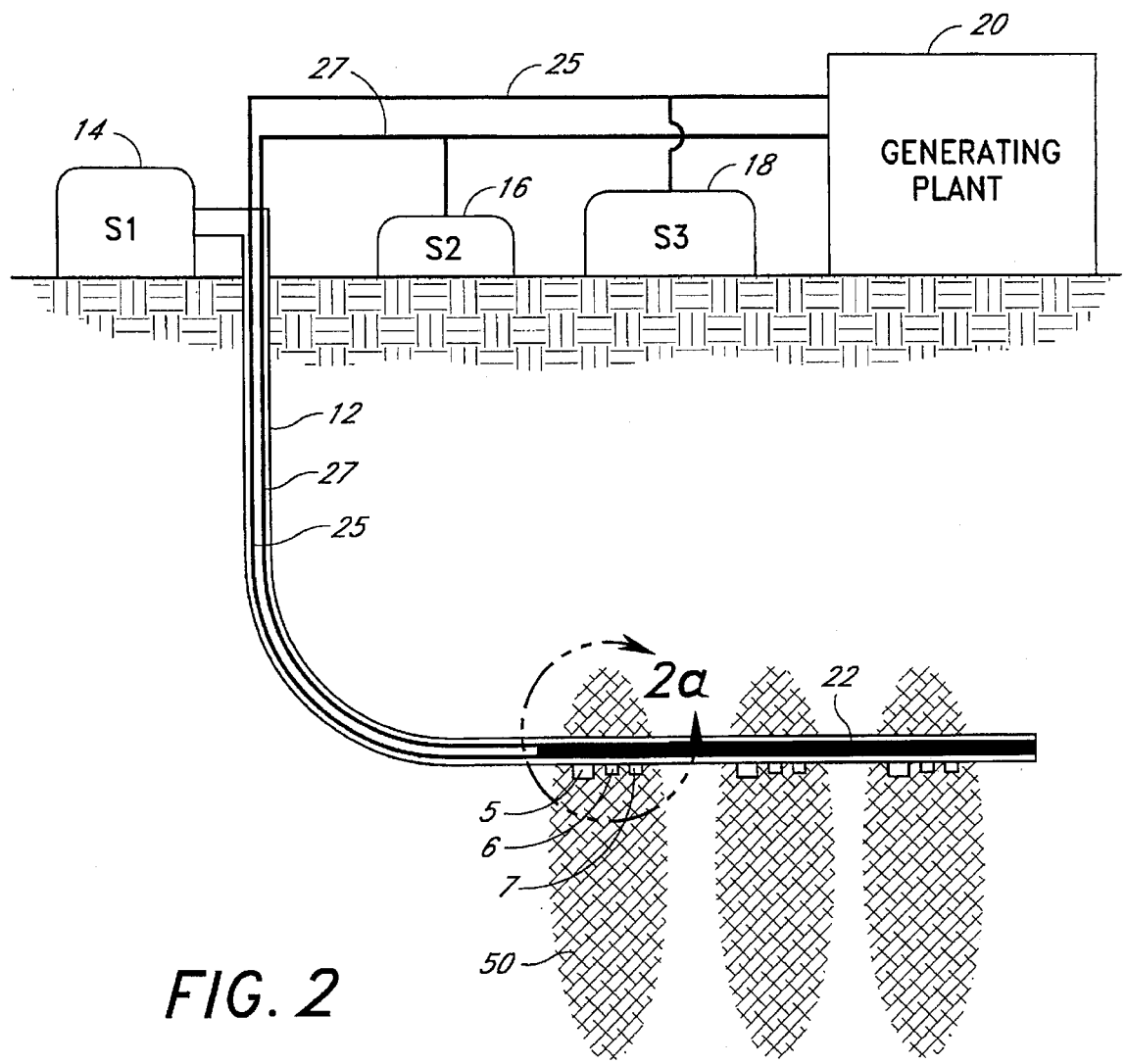
FIG. 2 is a cross-sectional schematic view of another preferred embodiment of the present invention illustrating an alternate means of releasing water into the hot, dry rock.
Figure 2A:
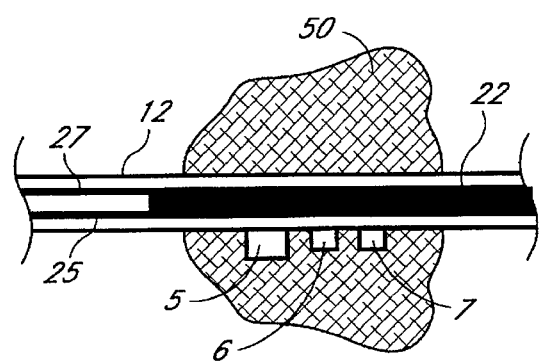
FIG. 2a is an enlarged cross-sectional schematic view of the bottom of the well of the system as shown in FIG. 2.

FIGS. 2 and 2a illustrate another embodiment which uses water directly from the water circulating within the well 12 instead of a separate conduit 11. In this embodiment, a valve 5, a pressure gauge 6, and a temperature gauge 7 are also used in a similar manner as described above with respect to FIGS. 1 and 1a. The embodiment of FIGS. 1 and 1a which injects water is used, however, in situations where the pressure in the fracture zone 50 is greater than the pressure inside the well 12. In such a case, the conduit 11 is coupled with a pump (not shown) at the surface to drive the water.

Referring to FIG. 1, the endothermic reaction takes place in the horizontal section of the well 12 which is surrounded by the fracture zones 50. Instead of having a horizontal section, the well 12 may be angled downwardly (not shown). The heat generated from the fracture zones 50 raises the temperature of the casing of the well 12, which correspondingly raises the temperature of the water within the well 12. In this environment, the catalytic device 22 is able to induce the endothermic reaction and separate the endothermic products.

Instead of being one continuous section as shown in FIG. 1, catalytic device 22 may be divided into a plurality of serially connected sections which are coupled together with a comparatively flexible tubing (not shown). Such a scheme is advantageous since the flexible tubing, such as a standard pipe, would be less costly than a continuous section of catalytic device 22 which is made substantially of ceramic. The flexibility is also advantageous due to the need for directional drilling to access the fracture zones 50. Headers (not shown) could be used to connect the flexible tubing to each catalytic device section where the tubing would be located in areas where the fracture zones 50 did not exist. The flexible tubing, such as pipe, should be impermeable to the endothermic products and able to withstand temperatures up to 800° C.

Figure 6:
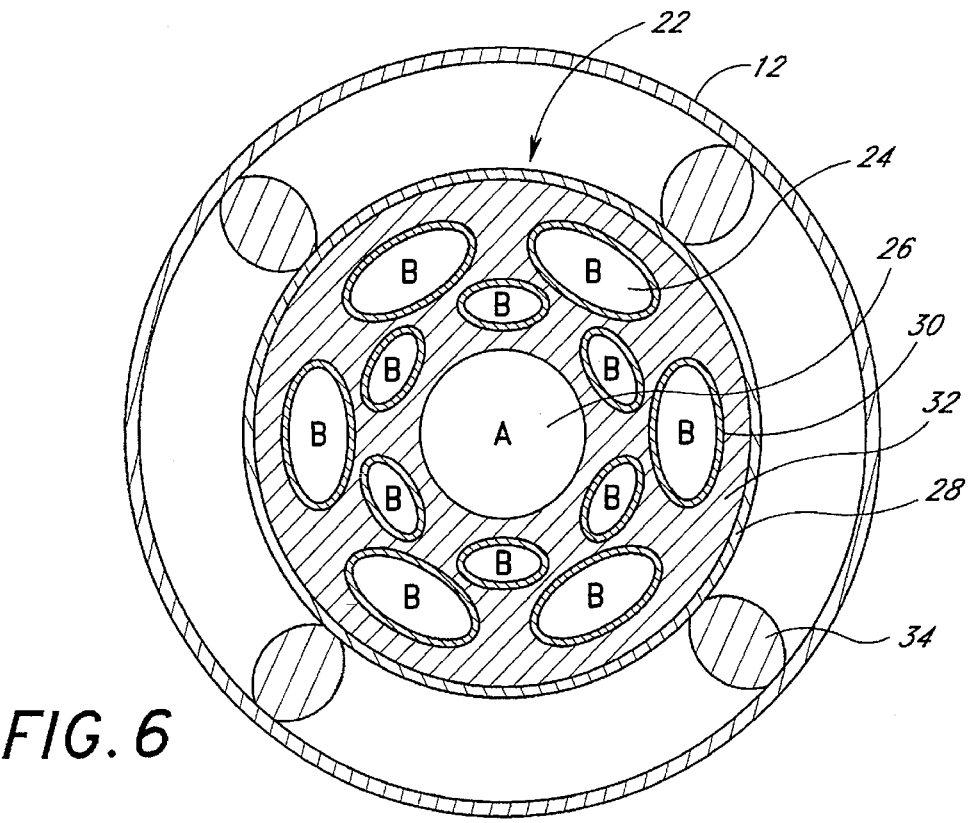
FIG. 6 is an enlarged cross-sectional view taken along line 6—6 of FIG. 1, showing the elements of the catalytic device of the system.

Referring to FIG. 6, a cross section of the bottom of the well 12 is illustrated to show a preferred embodiment of the catalytic device 22 in greater detail. The catalytic device 22 is supported within the well 12 by a plurality of rods 34 to allow the endothermic reactants to circulate around the catalytic device 22. The rods 34 may also be knobs or any other support device as is readily understood by those of skill in the art. As shown in FIG. 6, the catalytic device 22 comprises porous ceramic material 32, with the porous conduit 26 disposed substantially within the center of the ceramic material 32. The ceramic material 32 is selected to have a structure which would be relatively permeable to the endothermic products, but at the same time, would not encourage the reformation of the reactants within the ceramic material 32.

Substantially surrounding the porous conduit 26 and within the ceramic material 32 are a series of the porous conduits 24. The porous conduits 24 and 26 may be either tubes or conduits and may be circular in cross section, or may employ a different design that is more effective in collecting the products. The porous conduit 26 may be defined by a hole in substantially the center of the ceramic material 32. The porous conduit 24 is made from a material that is porous as to only one of the endothermic products. In the preferred embodiment where water is decomposed, the porous conduit 24 is made from a suitable transition metal, such as palladium, which is porous to hydrogen, but not oxygen. The porous conduit 26 is labelled in FIG. 6 by the letter A to represent that the porous conduit 26 receives endothermic product A, and the porous conduits 24 are labelled by the letter B to represent that the porous conduits 24 receive endothermic product B. In the preferred method, product A may refer to oxygen, for example, and product B may refer to hydrogen.

A thin film or mesh catalyst 28 on the catalytic device 22 is provided at the bottom of the well 12 to accelerate the series of reactions to produce the hydrogen and oxygen products. Thus, the water at the bottom of the well 12 reacts with the catalyst 28 on the surface of the catalytic device 22. Ceramic material is designed to be permeable to the endothermic reaction products so that the products will diffuse to their respective porous conduits 24 and 26. The porous conduit 24 and 26 are assembled within the ceramic material 32 to promote the separation of the products by absorbing them as they form on the catalyst 28.

As shown in FIG. 6, each porous conduit 24 is made from a selective material 30 which has the property of being porous only with respect to product B. Thus, product B of the endothermic reaction permeates the ceramic material 32 and is collected by the series of the porous conduits 24 after product B diffuses through the selective material 30. Since the selective material 30 is specifically designed to block the entry of product A, as product A diffuses through the ceramic material 32, product A maneuvers around the locations of the selective material 30 and through the passages between the series of the porous conduits 24 until product A diffuses into the porous conduit 26. As a result, the products A and B of the endothermic reaction are kept separate in their respective conduits, 26 and 24. Some of product B may, in fact, diffuse past the porous conduits 24 and eventually into the porous conduit 26 where this amount of product B reacts with product A. This reaction does not have any significant deleterious effect on the system. In the case of the decomposition of water for example, the porous conduit 26 is filled with oxygen and a small amount of water vapor that can be dehydrated from the oxygen at the surface.

Figure 3:
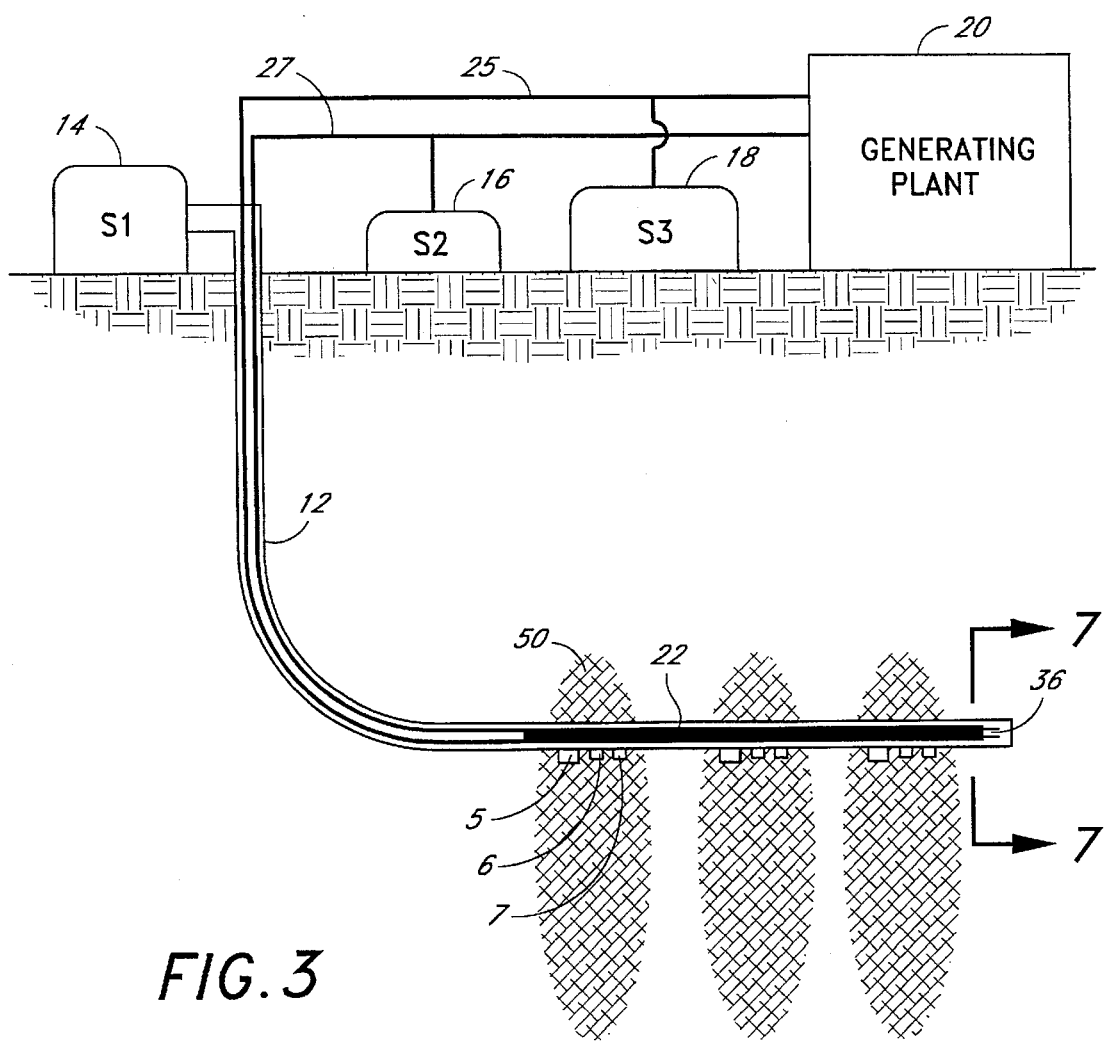
FIG. 3 is a cross-sectional schematic view of another embodiment of the system of the present invention.

Another embodiment of the system of the present invention is illustrated in FIG. 3, where a different catalytic device 22 is employed. Notwithstanding the embodiment illustrated in FIG. 3, the horizontal section of the well 12 may be angled downwardly (not shown). In FIG. 3 the catalytic device 22 is shown to have an open-ended tube 36 extending out from the end of the catalytic device 22. The open-ended tube 36 extends through the catalytic device 22 and is coupled to a standard conduit 27, desirably through a header (not shown).

Figure 7:
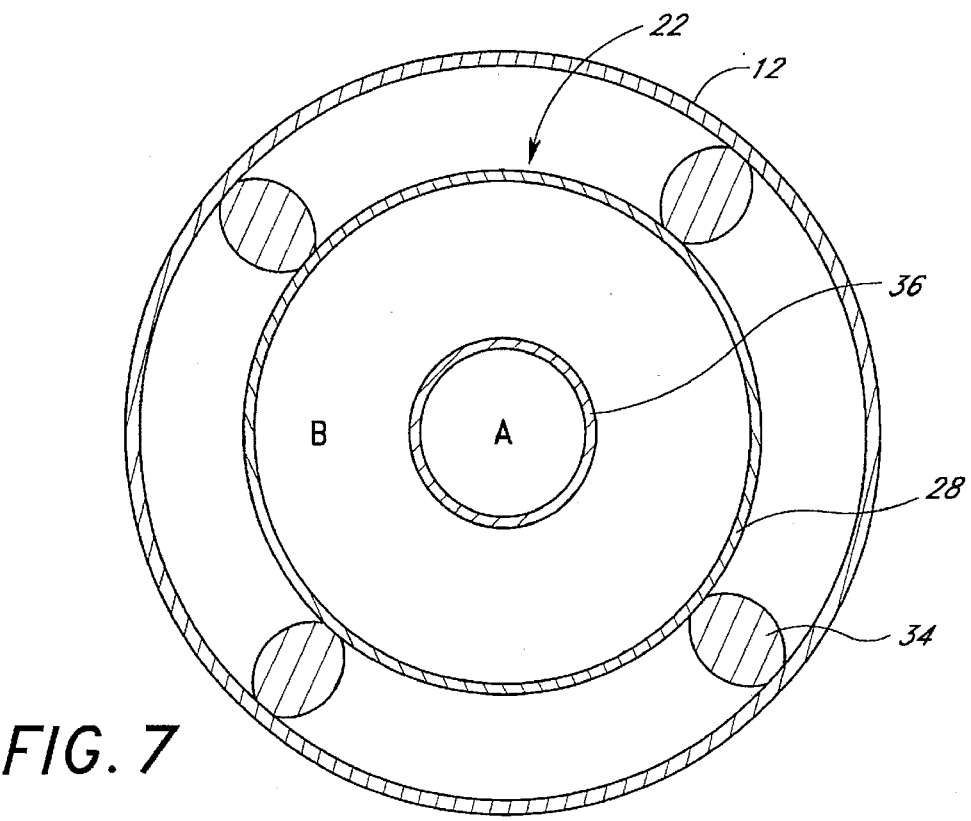
FIG. 7 is an enlarged cross-sectional view taken along line 7—7 of FIG. 3, showing an alternate embodiment of the catalytic device of the system.

This embodiment of the catalytic device 22 is shown in detail in the schematic cross section of FIG. 7. As in the embodiment of FIG. 6, the catalytic device 22 is supported in the middle of the well the well 12 by a plurality of support rods or knobs 34. The catalytic device 22 comprises a hollow conduit made of a catalyst 28, and substantially within the center of the catalyst 28 is extended a tube 36.

In the preferred case of decomposing water, the catalyst 28 is made from palladium which absorbs hydrogen into the hollow conduit. The oxygen is unable to diffuse through the palladium tube and continues to drift to the end of the well where the oxygen eventually enters the open end of the extended tube 36 as will water, ozone, and hydrogen peroxide. The oxygen, ozone, and hydrogen peroxide will more easily gravitate to the end of the well 12 when the horizontal section of the well 12 illustrated in FIG. 3 is angled downwardly. The oxygen, water, ozone, and hydrogen peroxide is pumped back up to the surface through the extended tube 36 and then the standard conduit 27. The oxygen and ozone will, and the hydrogen peroxide may, be separated out of the mixture before going to the turbine to undergo the exothermic reaction. Such separation may be accomplished by conventional means readily known to those of skill in the art. The hydrogen which diffuses through the palladium catalyst 28, rises to the surface through the hollow portion of the catalyst 28 and then the standard conduit 25 due to the high pressure at the bottom of the well 12.

Referring to FIG. 3, the catalytic device 22 provides two important functions: it harvests and separates the endothermic products, and it removes the products from the reservoir so that the elevated pressure in the reservoir does not oppose the endothermic reaction. A number of substances may catalyze the endothermic reaction. However, the products of the reaction are likely to readily recombine into the reactant(s), under the conditions existing in the well. In addition, the products of the endothermic reaction may be sufficiently reactive, especially at elevated temperatures, to react with the walls of the well or otherwise react in an undesirable manner once they escape from the surface of the catalyst. The products must therefore be collected and separated. Moreover, to the extent that the endothermic reaction provides more moles of product than it consumes moles of reactant, the reaction will be opposed by the high pressure environment that exists in the well 12. During operation the well 12, a column of water will create a very high pressure at the bottom of the column of water. Since every 10 meters adds 1 atmosphere of pressure, a well drilled to a depth of 3 kilometers would create a pressure of 300 atmospheres at the bottom of the well 12. This opposition by the pressure will be a major impediment to the reaction at the bottom of the well, which will be at a considerable depth and at an elevated temperature, causing the pressure to be increased significantly. Because the conduits or chambers 24 and 26 are permeable to the endothermic products, however, the very high pressure will force the products through the respective conduits 24 and 26, and thereby effectively decrease the number of molecules outside the catalytic device 22. Thus, the elevated pressure at the bottom of the well 12 promotes the endothermic reaction.

Additionally, the elevated pressure at the bottom of the well 12 forces the endothermic products up to the earth's surface through the porous conduits 24 and 26, and then the conduits 25 and 27. Thus, no pumps are required to transport the products up to the generating plant 20, although devices such as pumps could be used.

Figure 4:
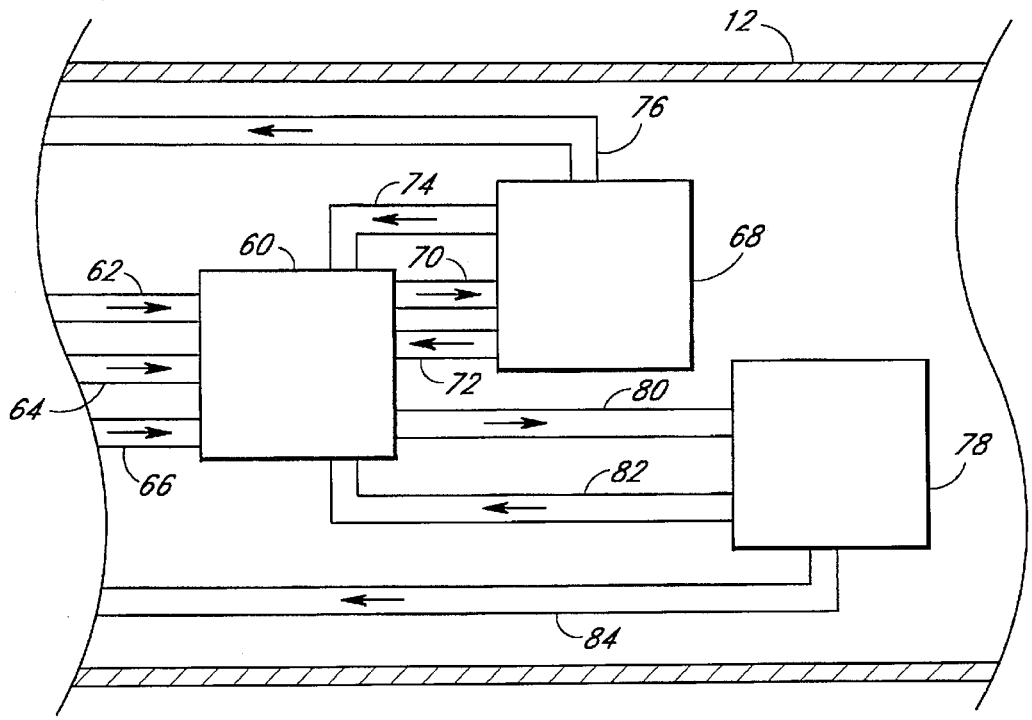
FIG. 4 is an enlarged cross-sectional schematic view of the bottom of the well of another embodiment of the system of the present invention.

Another means for inducing the endothermic reaction at the bottom of the well 12 is illustrated in FIG. 4. Because the temperature ordinarily necessary for the thermal decomposition of water is not present in the earth's crust at a depth that is currently attainable by practical means, the system illustrated in FIG. 4 does not directly decompose water to hydrogen and oxygen. Instead, the system of FIG. 4 accomplishes the decomposition of water through a sequence of endothermic reactions having sufficiently low activation energies to produce the desired products. Depending upon the conditions (primarily temperature and pressure) existing at the point of the endothermic reaction, any of several reactions could be used.

One such series of reactions utilizes as a first reaction $2H_2O+SO_2+I_2 \rightarrow H_2SO_4+2HI$ and the products of this first reaction are then decomposed in separate reaction chambers as follows: $2H_2SO_4 \rightarrow 2SO_2+2H_2O+O_2$ in one and $2HI \rightarrow I_2+H_2$ in the other. Thus, the overall endothermic reaction requires not only water, but sulfur dioxide and iodine as well. Therefore, in this embodiment, water, sulfur dioxide, and iodine are transported to the bottom of the well 12 into a first reaction chamber 60 through individual pipes 62, 64, and 66, respectively.

The first reaction chamber 60 produces the hydrogen sulfate which is transported through a pipe 70 to a second reaction chamber 68 where the hydrogen sulfate is broken down into water, sulfur dioxide, and oxygen. The water and sulfur dioxide is recycled back to the first reaction chamber 60 through pipes 74 and 72, respectively. The resulting oxygen from the second reaction chamber 68 is transported back up to the surface by a pipe 76. The first reaction chamber 60 also produces hydrogen iodine which is transported through a pipe 80 to a third reaction chamber 78 where the hydrogen iodine is broken down into iodine and hydrogen. The iodine is recycled back to the first reaction chamber 60 through a pipe 82, and the hydrogen is transported back to the surface through a pipe 84. The rate of the series of reactions may be controlled by having valves (not shown) in the pipes delivering the various compounds to the respective reaction chambers where the valves are controlled from the surface. Although oxygen and hydrogen are the only end products that are transported to the surface, the remaining end products, water, sulfur dioxide, and iodine are continually consumed by the series of reactions and reentered into the first reaction chamber 60 to produce more hydrogen and oxygen. Although sulfuric acid is produced in the first reaction, the acid is immediately decomposed in the subsequent reaction. Moreover, because the reactions that occur in the second reaction chamber 68 and the third reaction chamber 78 require a very high temperature, the second and third reaction chambers 68, 78 should be located in sections of the well 12 that are within the fracture zones 50.

Figure 5:
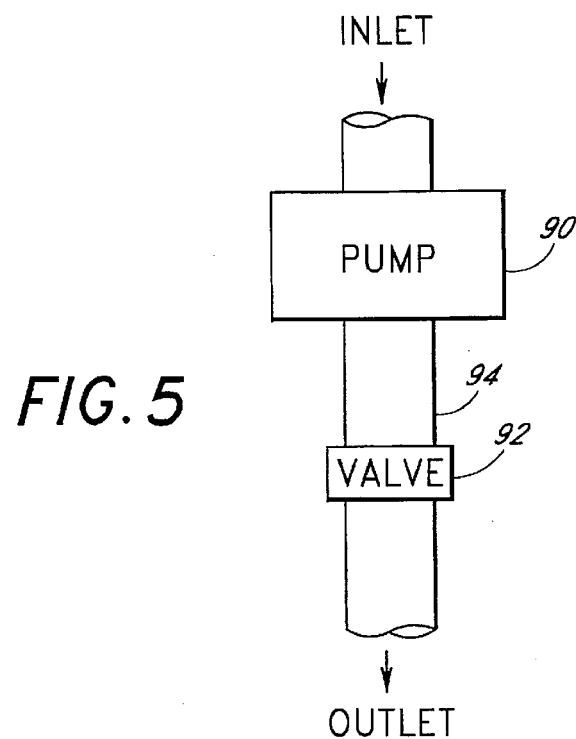
FIG. 5 is an enlarged cross-sectional view of an example of a pipe used in coupling the chambers illustrated in FIG. 4.

To further illustrate the mechanism of how a compound may be transported from one reaction chamber to another, FIG. 5 is provided. FIG. 5 shows a pump 90 and a valve 92 coupled to transport pipe 94 where the pump 90 and valve 92 are employed to control the deliverance of the gas within, for example, a transport pipe 94 to its respective reaction chamber. Although a pump has been shown, it is shown by way of example only, and depending on the various pressures involved, pumps (not shown) may be needed to facilitate the transport of gases. Pumps are not needed for the transport of gases oxygen and hydrogen through the pipes 76 and 84 since the elevated pressure at the bottom of the well 12 should cause the oxygen and hydrogen to rise to the surface.

Another reaction that can be used, the "water gas" reaction, $CH_4+H_2O \rightarrow CO +3H_2$, occurs spontaneously at 800° C. However, most such reactions may require oxygen from the air to complete the exothermic reaction and (whether or not they so require air) they may produce, in the course of the subsequent exothermic reaction, carbon dioxide, nitrogen oxides, or some other undesirable product. In addition, efficiency may be lost due to the need to use heat exchangers or other means to handle certain reaction products.

The primary advantage of relying on endothermic reactions in the system 10 of the present invention over existing prior art geothermal systems is that the system 10 absorbs a greater amount of heat per unit volume through the endothermic reaction than can be captured by the heated brine or steam. For example, the decomposition of a given mass of water captures five to six times the amount of heat that is represented by the same mass of steam. Due to the greater concentration of heat in the present invention, higher temperatures are achieved which improves the efficiency of the exothermic reaction in the turbine and the subsequent generation of electricity.

Additionally, the present invention requires only one well in contrast to the two wells required in prior art schemes. The endothermic reactants may be transported in the same well as the endothermic products since there is no danger that the reactants and products will interact. This is in contrast to previous systems where the injected water could not be transported in the same well as the rising steam for the steam would lose heat to the water, thereby reducing the efficiency of the prior art system. Moreover, the one well used in the present invention is less expensive to drill since the products of the endothermic reaction convey the energy in a comparatively much smaller volume than the steam or brine relied on by past geothermal systems. For example, in previous well systems to capture steam or brine from a reservoir, the cross-sectional area of the production well alone may be 36 inches. Because the present system 10 requires approximately one-sixth the space, the cross-sectional area of the well of the present system 10 may require, for instance, only 12 inches, 6 inches for injecting the water, and another 6 inches from transporting the hydrogen and oxygen.

Geothermal Generating System with Thermocouple Device

Figure 8:
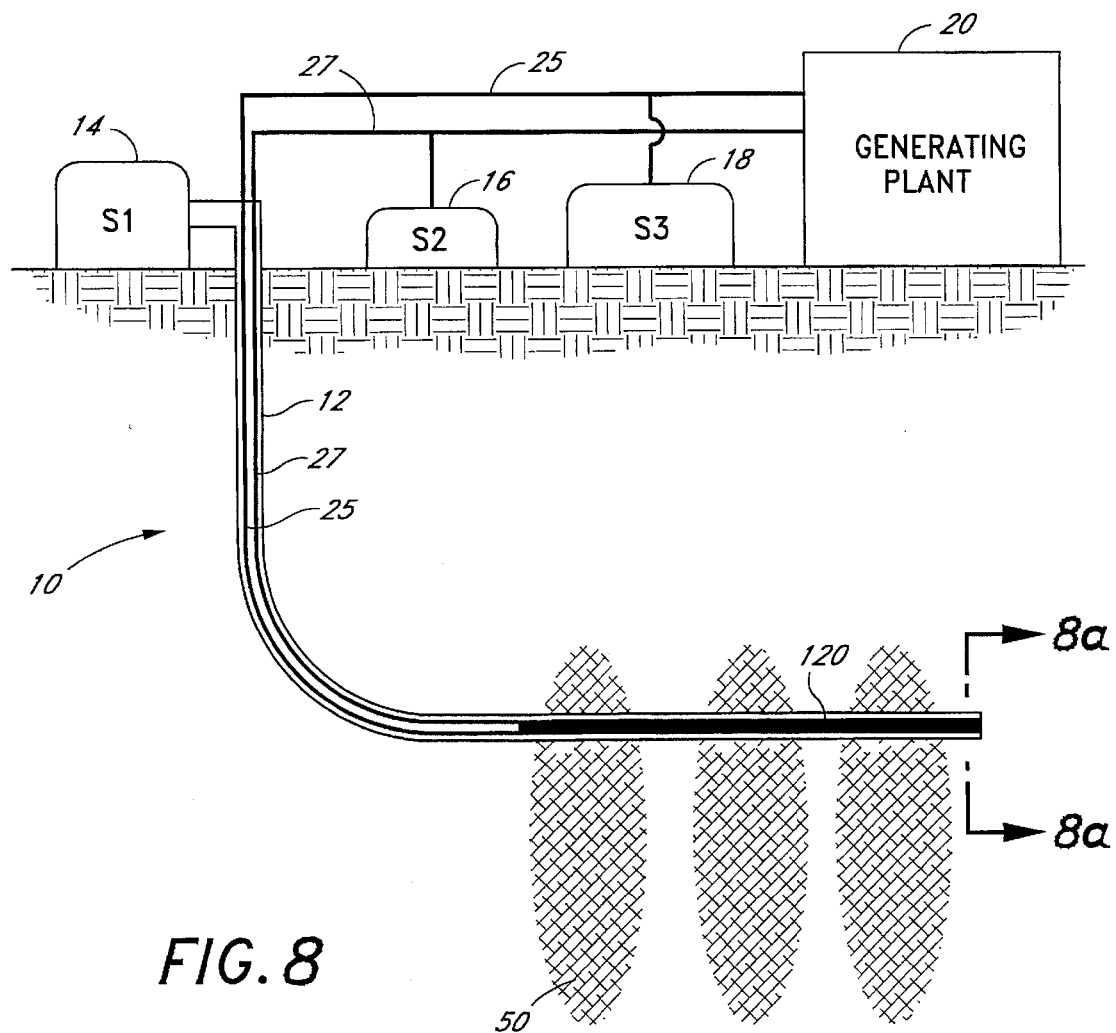
FIG. 8 is a cross-sectional schematic view of a preferred embodiment of the electrolysis system.
Figure 8A:
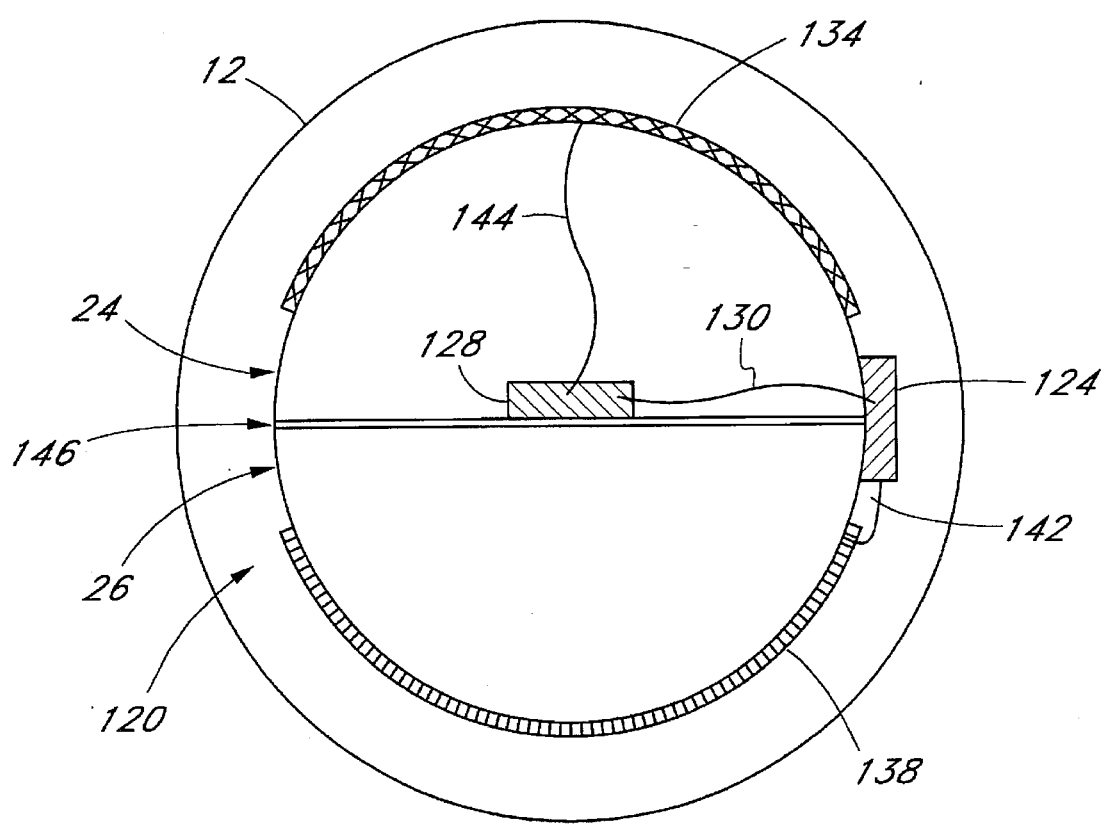
FIG. 8a is an enlarged cross-sectional schematic view of the bottom of the well of the system of FIG. 8.

FIGS. 8 and 8a illustrate another embodiment of the geothermal generating system 10 of the present invention. The well 12 is substantially the same as that of FIG. 1, except that the catalytic device 22 is replaced with a device connected to the conduits 25, 27 and containing a thermocouple 120. The part, of the well 12 containing the thermocouple device 120 may be either horizontal or angled downwardly (not shown). The conduits 25 and 27 are coupled to porous conduits or chambers 24 and 26 inside the thermocouple device 120. The conduits 24, 26 are supported within the well by a plurality of rods or knobs (not shown) to allow circulation around the outside of the conduits 24, 26.

The thermocouple device 120 generates a current which can be used to produce electricity or products of electrolysis that can be stored and used for electricity generation. The electrolytic device 120 is thus a device for converting the thermal energy in the well 12 into electrical energy. In a preferred embodiment, the thermocouple device 120 resides in the bottom section of the well 12, with one juncture or junction 124 (high-temperature juncture) outside of the porous conduits 24, 26 used for transporting product, and therefore at a higher temperature than the other juncture or junction 128 (low-temperature juncture) of the thermocouple 120, which is inside one of the conduits 24, 26. FIG. 8a shows the juncture 128 inside the conduit 24. The two junctures 124, 128 are connected by a wire or current-carrying means 130. The resulting electrical current is supplied to two separate areas of the surface of the conduits 24, 26, creating an anode 134 (conduit 24) at which one of the products (for example, hydrogen) is produced by the process of electrolysis (electrolytic reaction), and a cathode 138 (conduit 26) at which the other electrolytic product (for example, oxygen) is produced by the process of electrolysis. The electrolytic reactant(s) (electrolyzable compound) is stored in the storage tank 14 and supplied from the top of the well 12 to the thermocouple device 120. An example of the electrolysis of an electrolyzable compound is the decomposition of water into hydrogen and oxygen, which would be products of electrolysis. It is understood that other types of electrolytic device may be used to convert the thermal energy to electrical energy.

The junctures 124 and 128 of the thermocouple 120 are respectively connected to the anode 134 and the cathode 138 by wires or current-carrying means 142 and 144. The conduit 24 comprising the anode 134 is desirably made of a material that is permeable to the electrolytic product created by the anode 134 (palladium, for example, if the product is hydrogen) and the conduit 26 comprising the cathode 138 is desirably made of a material that is permeable to the electrolytic product created by the cathode. The conduits 24 and 26 preferably are not permeable to the compound undergoing electrolysis (e.g., water), so that as the electrolytic product is formed on the surface of the conduit 24 or 26, the elevated pressure in the well 12 forces the respective product into the conduit 24 or 26. As the product passes into the conduit 24 or 26, the drop in pressure causes a drop in the temperature of the product in the conduit 24 or 26, which cools the juncture 128 of the thermocouple 120 that is within the conduit 24 or 26. The pressure inside the conduits 24 and 26 will nonetheless be sufficiently high to push the products to the top of the well 12.

The products of electrolysis are transported separately through the porous conduits 24 and 26 and through the conduits 25, 27 to, e.g., the storage tanks 18 and 16, or the generating plant 20 for conversion to electricity. As in the prior embodiments, the energy of the electrolytic products are released upon undergoing an exothermic reaction and converted to electrical energy. The generating system 10 may use water directly from the water circulating within the well 12.

The conduits 24 and 26 have semicircular cross-sections in FIG. 8a and form a wall 146 therebetween that is impermeable to the electrolytic products. The two conduits 24 and 26 form a circle inside the well 12. The circle advantageously minimizes the size of the well 12 that needs to be constructed. For a given size of the well 12, therefore, the semicircular conduits 24 and 26 have the maximum internal volume. The volume in turn maximizes the pressure differential between the region inside the conduits 24, 26 and the region outside. The pressure differential is desirably because it forces the respective product into the conduit 24 or 26 and causes a maximum drop in the temperature of the product in the conduit 24 or 26, which cools the juncture 128 of the thermocouple 120 that is within the conduit 24 or 26. The pressure in the conduit 24 or 26 remains sufficiently high to drive the electrolytic products to the surface. Although FIG. 8a shows a double-wall formed by the walls of the two conduits 24 and 26, it is understood that a single wall that is impermeable to both products can also be used instead of the double-wall.

The conduits 24, 26, however, may have any shapes other than semi-circular. For instance, the conduits 24, 26 may be circular (not shown). The internal volume of the conduits 24, 26 will be one-half of the volume of the embodiment shown in FIG. 8a. The pressure differential between the area inside the conduits 24, 26 and the area outside will thus be less than the that of the embodiment formed by semi-circular conduits 24, 26.

Figure 9:
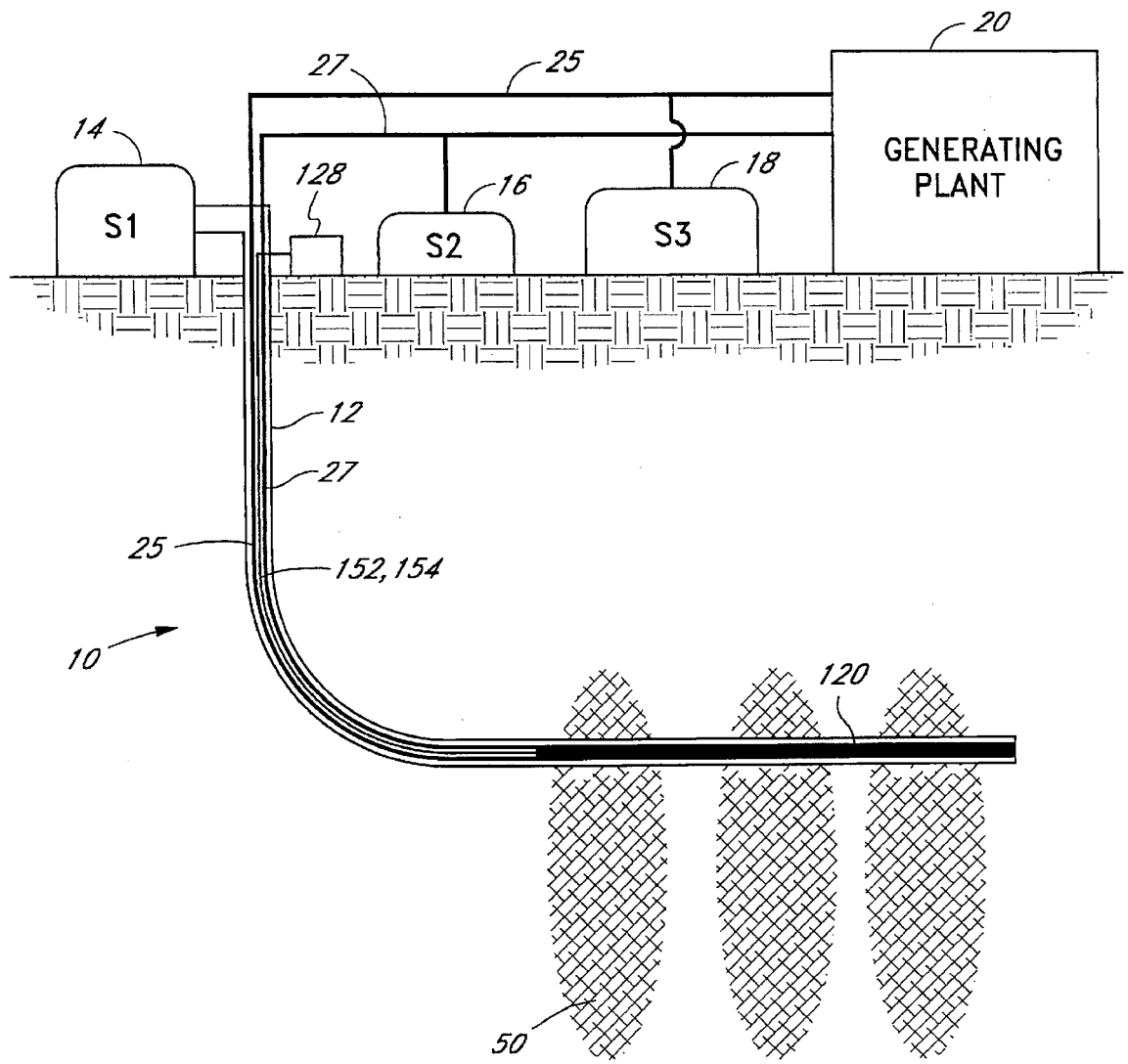
FIG. 9 is a cross-sectional schematic view of another embodiment of the electrolysis system of the present invention.

Another embodiment of the system 10 of the present invention is illustrated in FIG. 9. In this embodiment the system 10 does not depend upon the cooler temperature inside one of the conduits or chambers 24, 26 to cool one juncture 128 of the thermocouple 120. Instead, the juncture 128 resides at the surface, outside of the well 12, where it is maintained at a low temperature, and is connected by two wires, one wire 152 to the high-temperature juncture 124 of the thermocouple 120 residing outside of the conduits 24 and 26 at the bottom of the well 12, and the other wire 154 to the anode 134 on the surface of one of the conduits 24 and 26 at the bottom of the well 12 (similar to FIG. 8a). The cathode 138 and the anode 134 would produce their respective electrolytic products (e.g., hydrogen and oxygen) by electrolysis, and those products would be collected.

Figure 10:
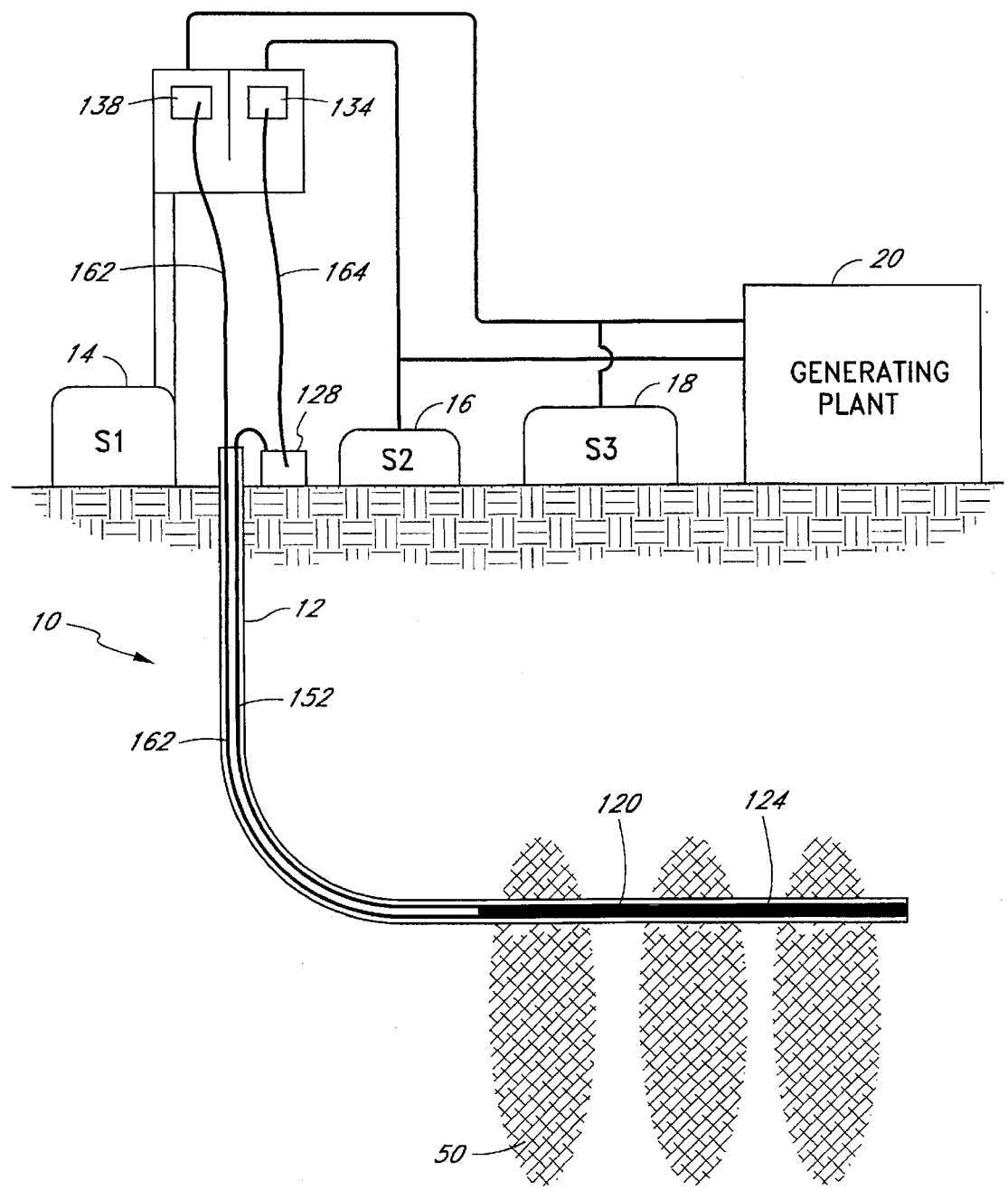
FIG. 10 is a cross-sectional schematic view of another embodiment of the electrolysis system of the present invention.

Another embodiment of the system 10 of the present invention is illustrated in FIG. 10. In this embodiment the juncture of the thermocouple 120 that is to be maintained at a high-temperature juncture 124 (similar to FIG. 8a) is placed at the bottom of the well 12 and connected by a wire 152 to the juncture 128 of the thermocouple 120 that is to be maintained at a lower temperature, which is placed outside of the well 12 at the surface. The two junctures 124, 128 are respectively connected by wires 162 and 164 to a cathode 138 and an anode 134 outside of the well 12 at the surface, where the products of the electrolysis are collected and used as fuels in the generation of electricity. In this alternative the well 12 does not contain any conduits.

Figure 11:
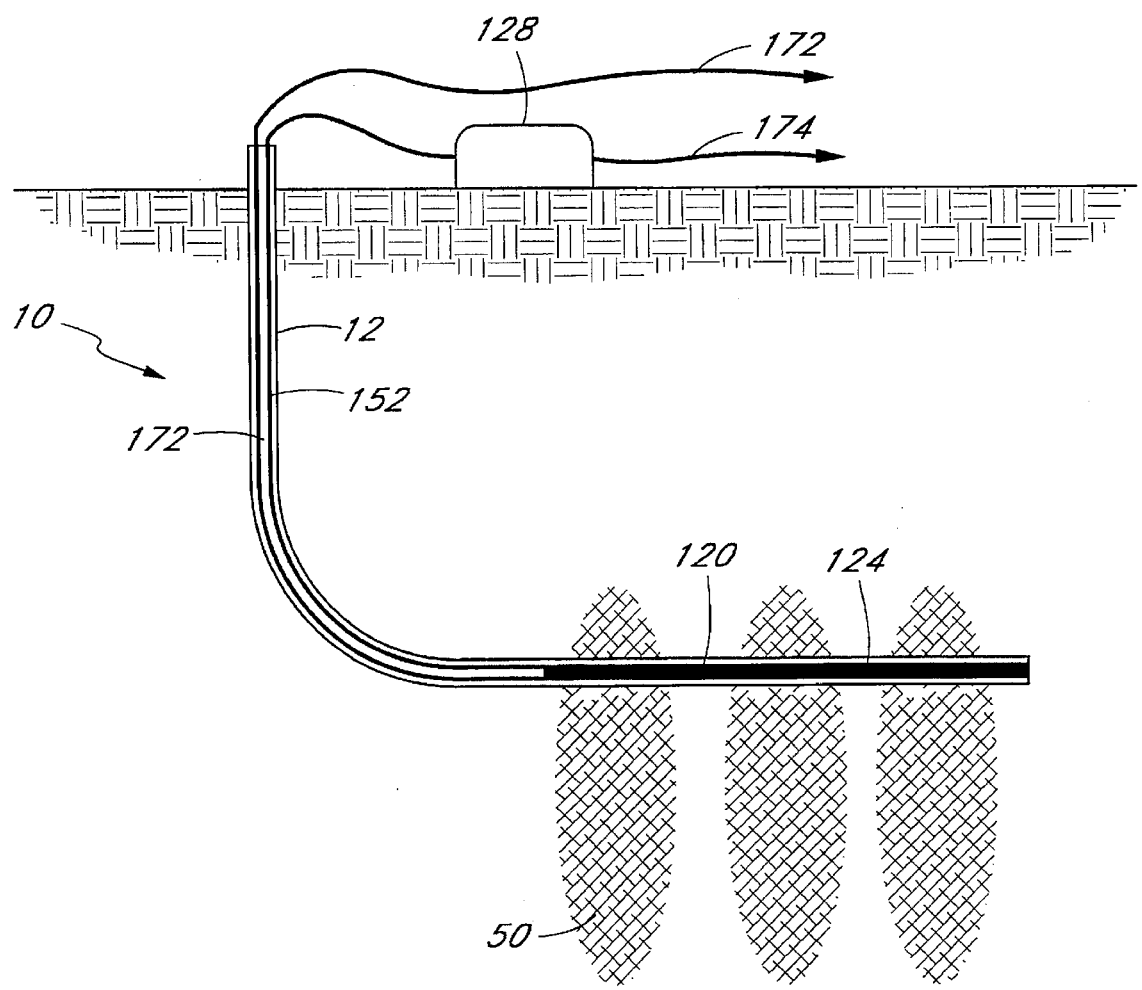
FIG. 11 is a cross-sectional schematic view of another embodiment of the electrolysis system of the present invention.

Yet another embodiment of the system 10 of the present invention is illustrated in FIG. 11. In this embodiment also the juncture 124 (similar to FIG. 8a) of the thermocouple 120 that is to be maintained at a high temperature is placed at the bottom of the well 12 and connected by a wire 152 to the juncture 128 of the thermocouple 120 that is to be maintained at a lower temperature, which is placed outside of the well 12 at the surface. The electricity produced by the thermocouple 120 is carried by wires 172 and 174 to the purchaser or user of the electricity. The electrolytic reactants, the conduits, and the combustion turbine or other generating device set forth below used for the prior generator embodiments are not necessary.

Combination Turbine

Figure 12:
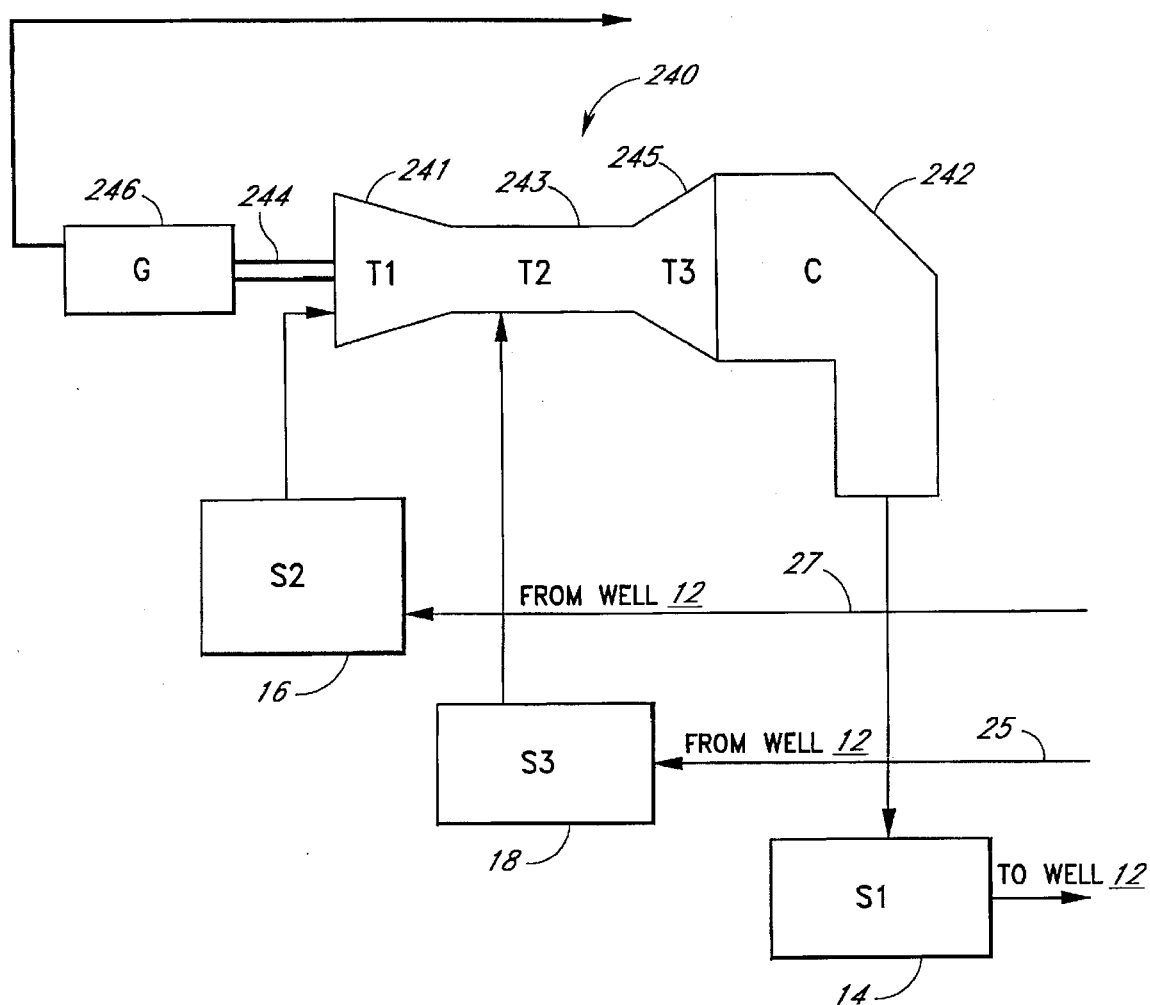
FIG. 12 is a schematic view of the combination turbine used in the system of the present invention.

Referring to FIG. 12, a schematic of a combination turbine 240 which produces the exothermic reaction to release the geothermal heat is illustrated. The combination turbine 240 comprises a turbine compressor stage 241, a turbine fuel injector and combustor stage 243, a turbine power stage 245, and a condenser 242. The turbine stages 241, 243, and 245 and the condenser 242 are advantageously constructed in a manner known to those of ordinary skill in the art. The combination turbine 240 is coupled to a generator 246 by a generator shaft 244 where the mechanical energy of the rotating generator shaft 244 is converted into electricity in the generator 246.

The turbine compressor stage 241 receives exothermic reactant A, which is product A from the endothermic (or electrolytic) reaction, from the storage tank 16 or directly from the well 12 through the conduit 27 (FIG. 1). Depending on the type of exothermic reactant A (endothermic or electrolytic product A), the reactant A may not need to be compressed, and thus the compressor stage 241 may not be required. In the preferred embodiment, exothermic reactant A is oxygen. Since the oxygen coming from the well 12 is already compressed due to the pressure in the well 12, the oxygen should be sufficiently compressed to obviate the need for the compressor stage 241. The turbine fuel injector and combustor stage 243 receives exothermic reactant B, which is product B from the endothermic (or electrolytic) reaction, from the storage tank 18, or directly from the well 12 through the conduit 25 (FIG. 1). In the preferred embodiment, exothermic reactant B is hydrogen.

In the stage 243, exothermic reactant B, i.e., hydrogen, acts as a fuel and combusts when mixed with exothermic reactant A, i.e., oxygen, to create a great amount of heat and produce steam. The resulting energy released by the exothermic reaction is harnessed to turn the blades within the power stage 245 which in turn rotates the generator shaft 244. After the exothermic product (steam) has passed through the turbine power stage 245, the exothermic product is immediately condensed in the condenser 242 where the exothermic vapor product is changed to liquid. The efficiency of the turbine 240 is improved by condensing the exothermic product to remove the back pressure from the turbine 240. The condensing of the exothermic product may be accomplished by means known to those of ordinary skill in the art. In the preferred embodiment the steam is condensed to water which is inserted into the endothermic (electrolytic) reactant storage tank 14 for reintroduction of the water into the well 12.

By combining the combustion turbine 240 with the condenser 242, the combination turbine of the present invention achieves a higher efficiency than previous combustion turbines where a steam turbine is also used in conjunction with a combustion turbine and a condenser. In the preferred embodiment of the present invention, efficiency is increased since the combination turbine does not require a heat exchanger to convert the heat of the exothermic product to steam. In past systems, the arrangement of the combination turbine of the present invention could not be employed because the exothermic product is a largely noncondensible pollutant as opposed to the condensible steam produced in the combination turbine 240 of the present invention.

Furthermore, to the extent that condensation creates a closed loop system where all of the exothermic product is condensed or otherwise captured, it is possible to make productive use of some of the energy that is lost in prior art systems with the exhaust, thus further increasing efficiency. To the same extent, the combination turbine 240 of the present invention avoids releasing pollution into the atmosphere, in contrast to prior art systems. Further, because the combination turbine 240 in the preferred embodiment is fueled by hydrogen and oxygen which are captive sources, dirt and other impurities that are taken into most combustion turbines from the air is avoided. Since the present invention relies on the endothermic (or electrolytic) products for conveying the geothermal heat, the products can be stored for use at a later time in contrast to previous systems where the captured steam or brine had to be utilized immediately. Accordingly, the combination turbine 40 of the present invention has the added flexibility of operating as a peakload unit to be turned on and off on demand, or as a baseload unit which functions at a constant rate.

Alternatively, the system 10 of the present invention may be used with a conventional combustion turbine, or a boiler with a steam turbine, or the products of the endothermic (or electrolytic) reaction might be used in a fuel cell.

It will further be apparent that the products of the endothermic (or electrolytic) reaction such as, for example, hydrogen and oxygen, are of value and the invention can be used to harvest these products and store them at the surface of the well 12 for uses other than producing electricity.

Further, the invention has utility in environments other than the geothermal well 12 and is useful in any environment, natural or man-made, having suitable temperature and pressure.

Scope of the Invention

The above represents a description of the best mode contemplated of carrying out the present invention, and of the manner and process of making and using it, in such full, clear, concise, and exact terms as to enable any person skilled in the art to which it pertains to make and use the invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed in the following claims, which particularly point out and distinctly claim the subject matter of the invention.

What is claimed is:

1. A system for capturing geothermal heat using electrolytic reactions, said system comprising:
   a well having a top and a bottom, where said well is drilled to a sufficient depth to acquire geothermal heat;
   a thermocouple residing at least partially within said well, said thermocouple for generating an electric current from said geothermal heat;
   an electrolytic device residing at least partially within said well; and
   means coupling said electrolytic device and said thermocouple.

2. The system of claim 1, wherein said electrolytic device comprises an anode and a cathode coupled for generating said electric current.

3. The system of claim 2, wherein said means includes electrical wires couple to the anode and cathode for transporting the electric current.

4. A method of capturing geothermal heat using electrolytic reactions comprising the steps of:
   inserting a reactant into a well, said well having a sufficient depth to acquire geothermal heat through electrolytic reactions;
   providing an electrolytic device into said well;
   performing an electrolytic reaction in said well using said reactant; and
   retrieving products of said electrolytic reactions to the surface of said well.

5. A system for capturing geothermal heat using electrolytic process comprising:
   a well having a top and a bottom, where said well is drilled to a sufficient depth to acquire geothermal heat through the electrolytic process when at least one electrolyzable compound is inserted into the bottom of said well;
   a thermocouple device residing at least partially within said well, said thermocouple device for harvesting and separating the products of electrolysis of said electrolyzable compound;
   at least one conduit for transporting products of the electrolytic processes to the top of said well; and
   a means coupled to said conduit for harnessing said products of the electrolytic process.

6. A system for capturing geothermal heat using electrolytic reactions and releasing the heat through exothermic reactions to convert to electricity, said system comprising:
   a well having a top and a bottom, said well being drilling to a sufficient depth to acquire geothermal heat through the electrolytic reactions when reactants are inserted into said well;
   a device residing at least partially within the bottom of said well, said device for harvesting and separating products of said electrolytic reactions;
   first and second conduits for transporting said products of the electrolytic reaction to the top of said well; and
   a means coupled to said first and second conduits for using said products of the electrolytic reactions to create exothermic reactions to generate power.

7. The system of claim 6, wherein said well is coupled to a first storage tank for storing said reactants of said electrolytic process.

8. The system of claim 6, wherein said system further comprises a second storage device coupled to said first conduit for storing a first product of the electrolytic reactions.

9. The system of claim 6, wherein said system further comprises a third storage device coupled to said second conduit for storing a second product of the electrolytic reactions.

10. The system of claim 6, wherein said means coupled to said first and second conduits comprises a combustion turbine coupled to a condenser.

11. The system of claim 10, wherein said turbine further comprises a compressor coupled to an inlet of said turbine.

12. The system of claim 10, wherein output of said condenser is coupled to a first storage tank for storing said reactants of said electrolytic process.

13. The system of claim 6, wherein said device comprises a first porous conduit for receiving the first product, a second porous conduit for receiving the second product and coupled to said first porous conduit, a selective material surrounding said second porous conduit where said selective material is porous only to the second product, a low-temperature juncture inside, and connected through a first wire to a surface of, one of said first and second conduits, a high-temperature juncture outside said conduits and connected through a second wire to a surface of another one of said first and second conduits, and said low-temperature juncture and said high-temperature juncture being connected through a third wire.

14. The system of claim 13, wherein the low-temperature juncture is connected through the first wire to the surface of the first conduit to form an anode and the high-temperature juncture is connected through the second wire to the surface of the second conduit to form a cathode, said junctures supplying a current to said first and second wires.

15. The system of claim 13, wherein the first and second conduits are semi-circular in cross-section with planar wall portions that are coupled together.

16. The system of claim 6, wherein said device comprises a first porous conduit for receiving the first product, a second porous conduit for receiving the second product and coupled to said first porous conduit which is porous only to the first product, and a high-temperature junction outside said conduits, said high-temperature junction having a first wire which connects to a surface of said second conduit and a second wire which connects to a low-temperature junction disposed at the top of the well, said first conduit having a surface which is connected to a low-temperature junction disposed at the top of the well.

17. The system of claim 6, wherein said device comprises a hot juncture including a first current-carrying means which is connected to a cathode and a second current-carrying means which is connected to a cold juncture, said cold juncture connected through a third current-carrying means to an anode, said cathode, anode, and cold junction disposed at the top of the well.

18. The system of claim 6, wherein the electrolytic reaction is the decomposition of water.

19. The system of claim 6, wherein the well is drilled down to the fracture zones of hot, dry rock.

20. The system of claim 6, wherein said means coupled to said first and second conduits comprises a fuel cell.

21. A thermocouple device for generation of electricity by geothermal heat from a well having a top and a bottom and using the electricity to perform an electrolytic process, said device comprising:

a first juncture maintained at a first temperature and disposed in the bottom of said well;

a second juncture maintained at a second temperature lower than said first temperature;

a current-carrying means coupled to said first and second junctures;

wherein said second juncture is disposed in a first conduit at the bottom of said well, said current carrying means including a wire coupling said first juncture to a cathode, and another wire coupling said second juncture to an anode, said anode and cathode performing said electrolytic process.

22. The device of claim 21, wherein said anode is formed on a surface of said first conduit.

23. The device of claim 21, wherein said cathode is formed on a surface of a second conduit at the bottom of said well.

24. The device of claim 23, wherein said first and second conduits are semi-circular in cross-section with planar wall portions that are coupled together.

25. The device of claim 24, wherein said first and second conduits are porous to receive respectively a first and a second products of electrolysis, said first porous conduit being porous only to the first product.

26. A thermocouple device for generation of electricity by geothermal heat from a well having a top and a bottom and using the electricity to perform an electrolytic process, said device comprising:

a first juncture maintained at a first temperature and disposed in the bottom of said well;

a second juncture maintained at a second temperature lower than said first temperature;

a current-carrying means coupled to said first and second junctures;

wherein said second juncture is disposed at the top of said well, said current-carrying means including a wire coupling said first juncture to a cathode, and another wire coupling said second juncture to an anode, said anode and cathode performing said electrolytic process.

27. The device of claim 26, wherein said anode is formed on a surface of a first conduit at the bottom of said well and said cathode is formed on a surface of a second conduit at the bottom of said well.

28. The device of claim 26, wherein said anode and cathode are disposed at the top of said well.

29. A system for capturing and utilizing geothermal heat using a process of electrolysis and releasing the heat through exothermic reactions to produce electricity, said system comprising:

a well having a top and a bottom, where said well is drilled to a sufficient depth to acquire sufficient geothermal heat to promote said process of electrolysis;

a device residing within the bottom of said well, said device for harvesting and separating the products of said process of electrolysis;

means for supplying water from the top of said well to said device;

a first chamber within said device having walls which are substantially porous to a first product of said process of electrolysis and substantially impermeable to a second product of said process of electrolysis;

a second chamber within said device having walls which are substantially porous to said second product of said process of electrolysis;

first and second conduits respectively coupled to said first and second chambers for transporting said products of the process of electrolysis to the top of said well, the high pressure environment within said well at the depth of said device being utilized to force said products through said device and through said first and second conduits to the top of said well; and a combination turbine coupled to said first and second conduits for using said products of the process of electrolysis to create said exothermic reactions for generating electricity.

* * * * *

UNITED STATES PATENT AND TRADEMARK OFFICE
CERTIFICATE OF CORRECTION

PATENT NO. : 5,661,977

DATED : September 2, 1997

INVENTOR(S) : SYSTEM FOR GEOTHERMAL PRODUCTION OF ELECTRICITY

It is certified that error appears in the above-identified patent and that said Letters Patent is hereby corrected as shown below:

In Column 18, line 9, please replace "being drilling to", with --being drilled to--;

In Column 19. line 11, please replace "cold junction", with --cold juncture--;

In Column 20, line 43, please replace "said device", with --said thermocouple device--.

Signed and Sealed this

Twenty-fourth Day of November, 1998

*Attest:*

BRUCE LEHMAN

*Attesting Officer*  *Commissioner of Patents and Trademarks*